Aug. 26, 1930.  J. G. COUTANT  1,773,954
TREATMENT OF FURNACE GASES
Filed Sept. 8, 1928   3 Sheets-Sheet 1
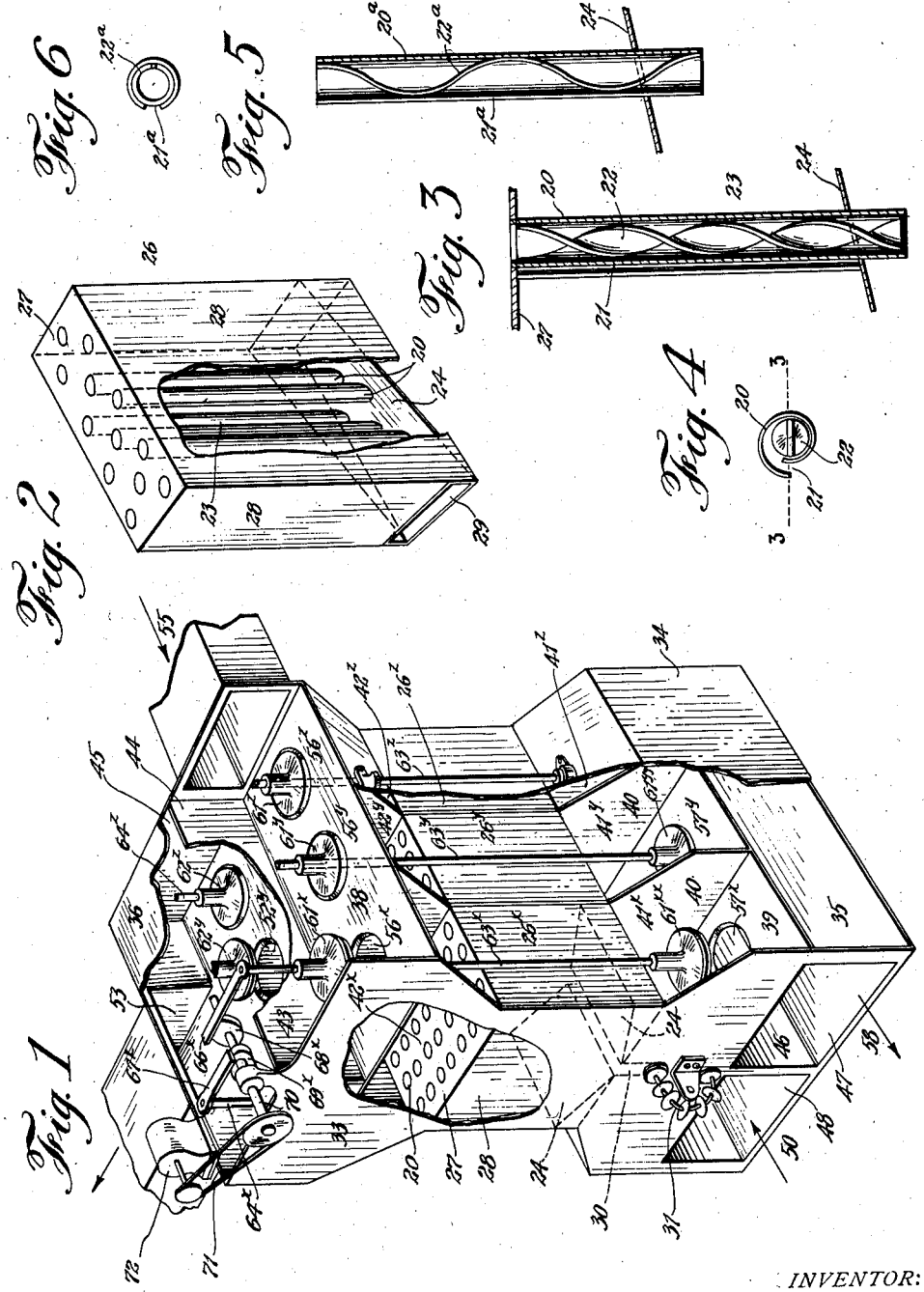
INVENTOR:
Jay Gould Coutant
BY
Morrison, Kennedy & Campbell
ATTORNEYS.

Aug. 26, 1930.  J. G. COUTANT  1,773,954
TREATMENT OF FURNACE GASES
Filed Sept. 8, 1928  3 Sheets-Sheet 2
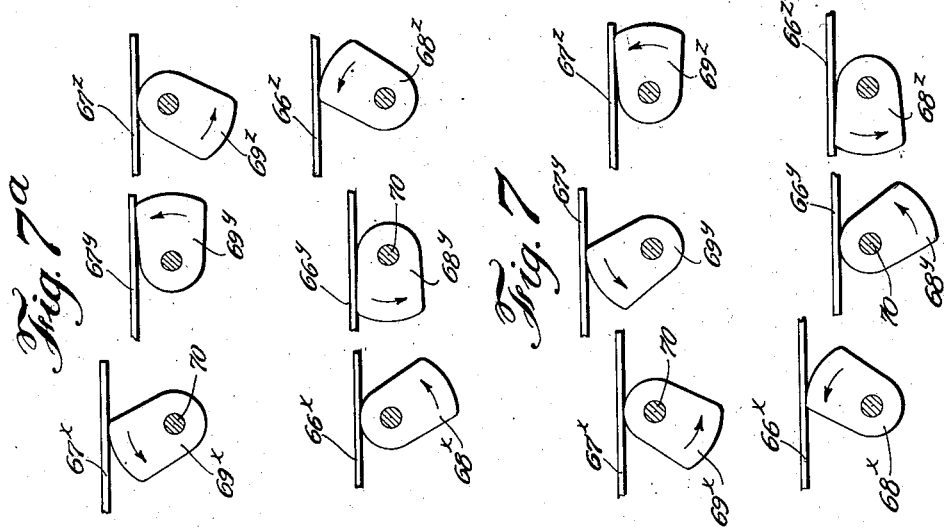
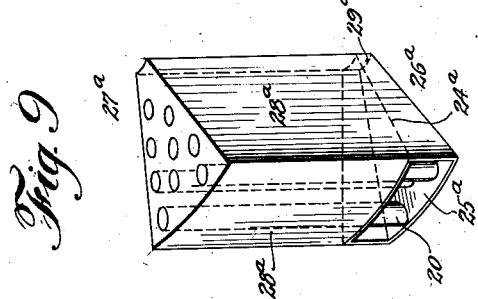
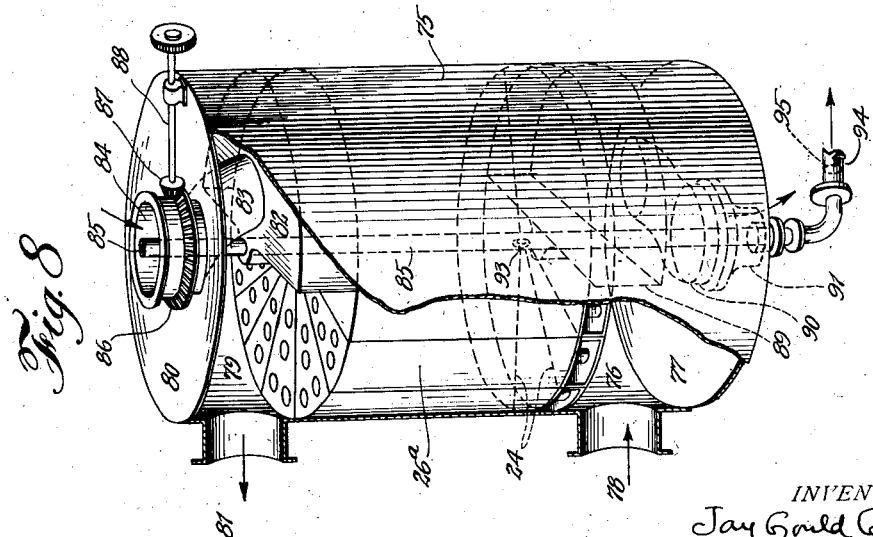
INVENTOR:
Jay Gould Coutant
BY
Morrison, Kennedy & Campbell
ATTORNEYS.

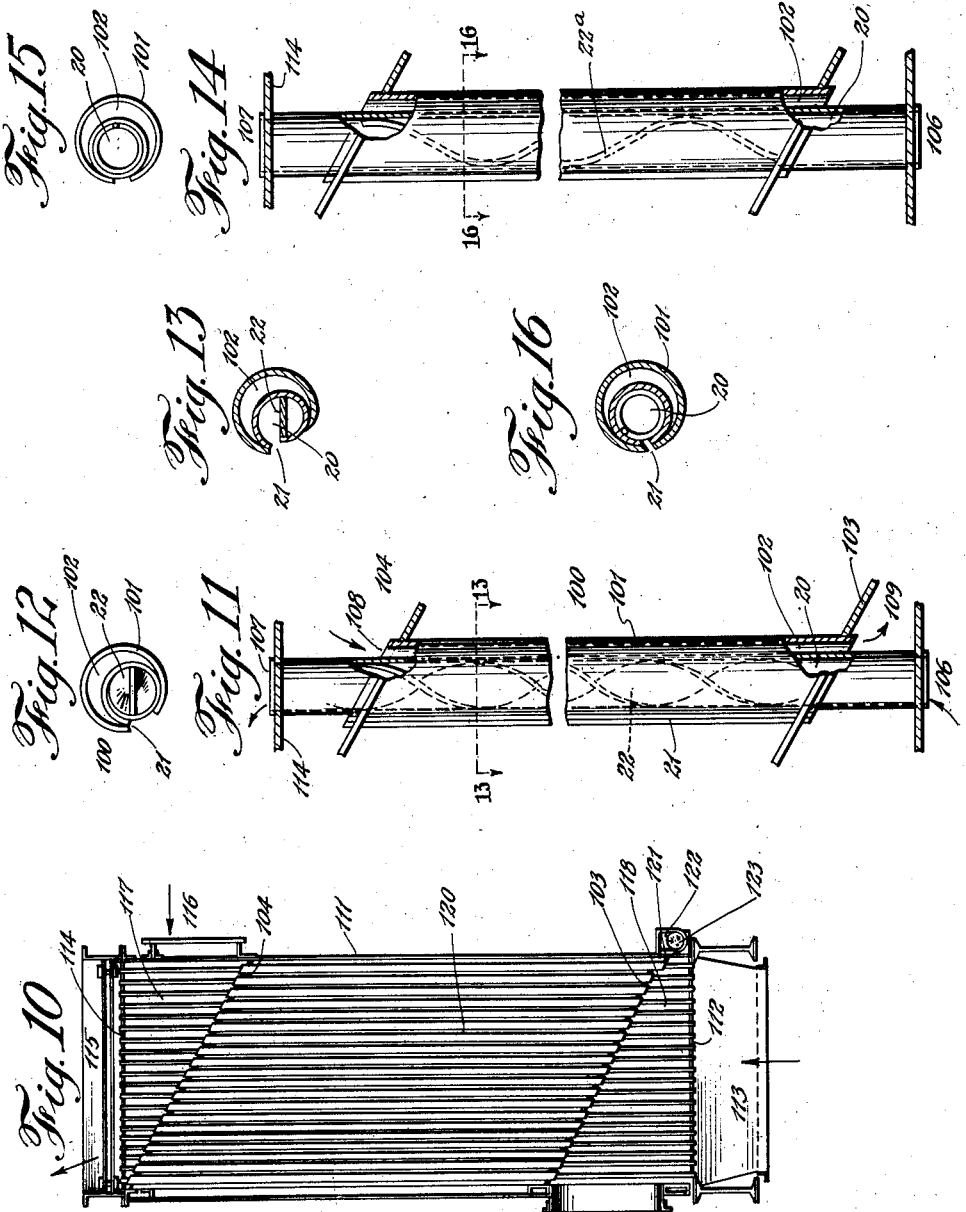

Patented Aug. 26, 1930

1,773,954

UNITED STATES PATENT OFFICE

JAY GOULD COUTANT, OF NEW YORK, N. Y., ASSIGNOR TO WARREN C. DRAKE, ERNEST B. PRIEBE, AND HARRY BUCHERT, ALL OF NEW YORK, N. Y.

TREATMENT OF FURNACE GASES

Application filed September 8, 1928, Serial No. 304,747, and in France September 21, 1927.

This invention relates to treatment of furnace gases and has reference more especially to method and apparatus for separating or extracting dust from furnace gases and for extracting, absorbing and utilizing heat therefrom by the heating of air, water or other fluid. The invention is of particular utility in respect to modern high service boiler furnaces wherein the rapid travel of the gases tends to cause the carrying off of large quantities of furnace dust, by which term it is intended to include floating particles of fuel, cinders, ashes, etc, and wherein the prevailing high temperatures causes substantial loss of heat passing to the stack with the outgoing gases.

One of the objects therefore of the present invention is to separate, extract and collect the dust from the outgoing gases as effectively as possible, thus avoiding the notorious objections to discharging furnace dust into the atmosphere; and this part of the invention, in the recovery of the solid matters, permits them to be subject to further combustion when the percentage of combustible warrants it, and affords the collected matters as a by-product. A further object is to absorb as effectively as possible the outgoing and otherwise waste heat thus permitting substantial heat energy to be recouped and utilized. A further and combined object is to afford in a single method or step and by a single apparatus both of the described functions, namely the extraction and collection of dust and the extraction and absorption of heat from the outgoing furnace gases, for example to preheat air to be supplied to the furnace.

Other and further objects and advantages of the present invention will be explained in the hereinafter following description of illustrative embodiments thereof or will be understood to those conversant with the subject. To the attainment of such objects and advantages the present invention consists in the novel furnace gas treating method and apparatus and the novel features of operation, combination, arrangement, construction and detail herein illustrated or described.
The principle of extraction of dust by this invention comprises the subdividing of the furnace gases into numerous small streams or threads of gas and subjecting each of them to centrifugal action within elongated tubular elements so as to cause the dust to pass out by its momentum through lateral apertures into settling spaces, which may be described as dead or having no circulation. While the tubular elements could be so constructed as to afford centrifugal discharge in various ways, preferably they are of substantially circular cross section, with interior vanes or other means producing whirling motion and peripheral apertures or slits allowing the exit of the solid particles into the dead spaces; and rather than a series of exit apertures the tubular elements are formed with continuous longitudinal slits, advantageously afforded by bending or wrapping the metal into a scroll with the exit between convolutions having the same direction as the interior rotation of gases. In the aspect of a combined dust extractor and fluid heater the invention comprises the tubular elements just referred to or their equivalents for conducting the gases in numerous streams from which the dust is extracted in combination with flow passages whereby the air or fluid to be heated is brought into direct contact with the heated walls of the tubes, preferably on the counter flow principle, so as to absorb the heat thereof either by regenerative action within the tubes or by continuous heat transmission through the tube walls from the hot gases within to the fluid without.

In the accompanying drawings Fig. 1 is a perspective view, somewhat in diagram, of a dust extracting and fluid heating apparatus embodying the present invention.

Fig. 2 is a perspective view of a section or unit of apparatus such as is embodied in Fig. 1 comprising a group of tubular elements in their enclosing envelop or box.

Fig. 3 is a vertical central section of one of the tubular elements of Figs. 1 and 2 detached, taken substantially on the line 3—3 of Fig. 4.

Fig. 4 is a top plan view of the element shown in Fig. 3.

Fig. 5 shows a modified form of tubular element in vertical section, and Fig. 6 is a top plan view thereof.

Fig. 7 is a diagrammatic left elevation of the several cams of Fig. 1, and their wipers; and Fig. 7a is similar, but shows the cams at a subsequent position.

Fig. 8 is a perspective view of a dust extracting and fluid heating apparatus constituting a modification of type, but embodying the same principles as the apparatus shown in Fig. 1.

Fig. 9 is a perspective view of a unit or section of apparatus such as is indicated in Fig. 8.

Fig. 10 is an elevation view of a yet different type of dust extracting and fluid heating apparatus operating on different principles from Figs. 1 and 8, but embodying the basic invention hereof.

Fig. 11 is an elevation view, partly broken away, of one of the tubular elements of the apparatus of Fig. 10.

Fig. 12 is a top plan view of the tubular portions of Fig. 11.

Fig. 13 is a horizontal section taken on the line 13—13 of Fig. 11.

Fig. 14 is a view similar to Fig. 11 showing a modified form of tubular element.

Fig. 15 is a top plan view of the tubular portions of Fig. 14, and Fig. 16 is a horizontal section taken on the line 16—16 of Fig. 14.

Referring first to Figs. 3 and 4 these show, detached, one of the elongated tubular elements 20. This is shown as generally cylindrical and with peripheral aperture 21 in a form of a slit or exit produced preferably by offsetting the tube edges to give it the form of a scroll. As seen in Fig. 4, this gives an exit direction tangential to the direction of whirling rotation of the gases ascending in the tube, namely counterclockwise. This rotary motion may be produced by interior vanes 22 either formed on the tube interior or constituted of a simple twisted metal strip as shown. The solid particles are whirled around and discharged from the tube through the slit into the dead space or chamber 23 surrounding the tube, this being closed against circulation so that the ascending gases are prevented from passing out the slit, thus giving an effective separating action between the dust and the gases. At the foot of the dust chamber 23 is a receiving plate 24 which is preferably inclined so that the dust tends to move downwardly by gravity toward a discharge point. The dust exit or slit 21 preferably terminates at the receiving plate 24 so that no dust will leave the tube except into the dead space above the plate. In the modification shown in Figs. 5 and 6 the tube 20a has a simple slit 21a and the gas whirling means consists of a helical bar or wire 22a, the construction otherwise being similar to Figs. 3 and 4.

A plural number or group of tubular elements 20 is shown assembled within a sectional envelop or box 26, as shown separately in Fig. 2, this comprising the inclined receiving plate or bottom wall 24 and a top plate 27, both of these perforated to receive the ends of the tubular elements, also lateral side and end walls 28, these several walls enclosing the chamber 23, and one of the walls having a dust delivering outlet 29 toward which the receiving plate 24 inclines, to permit the dust to be removed at intervals or continuously in a manner preventing the gases passing through the chamber 23. The box 26 enclosing the chamber 23 and containing numerous tubular elements 20 may be considered as a unit of apparatus suitable for embodiment in the structures shown in the main figures. In Fig. 2 the section or unit 26 is of generally rectangular form. In Fig. 9 is shown a unit 26a of sector form adapted to be built up in a circular apparatus, this having a sector top plate 27a, vertical walls 28a, and inclined receiving plate 24a and beneath that a bottom wall 25a. This unit is shown truncated along the point of the sector for purposes that will be explained in connection with Fig. 8. In any case the inclined receiving plate 24 or 24a may be of generally hopper shape in the assembled apparatus as indicated by the two inclined plates 24 in Fig. 1 mutually delivering to a central outlet trough 30, from which the dust is shown as being continuously conveyed by a type of endless disk conveyor 31 preventing gases flowing out with the dust.

Fig. 1 shows a type of apparatus with certain general similarities to a certain commercially known air preheating apparatus, but intended for carrying out the principles and functions of the present invention. It is intended to be located between the outgoing flues of a furnace and the stack and is shown as comprising series of three of the units or tube groups 26x, 26y and 26z, each generally similar to Fig. 2, but with the double inclined or hopper shape dust receiving plate. While only three sections or units are shown in Fig. 1 the principle could be carried further since the operation of this apparatus is the employment in rotation of the several units, there being always at least one unit in use for the conduction of outgoing gases and extraction of dust and at least one of them in use for conducting and preheating the incoming air or fluid.

The three units are shown in Fig. 1 as housed within an outer shell comprising side wall plates 33, front and rear walls 34, conforming to the interior compartments, bottom or base wall 35 and top wall 36. Between the tube units and the top wall is shown a horizontal partition 38 spaced from both, and similarly between the units and the bottom of the apparatus is a lower horizontal partition 39. Extending vertically, and frontward and rearward, between the partitions 38 and 39 are two vertical partitions 40 separating and isolating the three units from each other. By this arrangement, below the three sections or units and between them and the horizontal partition 39 are formed three chambers or flues $41^x$, $41^y$ and $41^z$, one beneath each unit and communicating with the tubular elements therein. Similarly, above the three units and between them and the upper partition 38 are formed three similar chambers $42^x$, $42^y$ and $42^z$ communicating respectively with the tubular elements in each group.

The interior space above the upper partition 38 is shown divided by a longitudinal vertical partition 43 into an upper front compartment 44 and an upper rear compartment 45. Similarly, below the lower horizontal partition 39 is a longitudinal vertical partition 46 dividing the underneath space into a lower front compartment 47 and a lower rear compartment 48.

Omitting for the moment the valves to be described the hot gases from the furnace enter the apparatus by an entrance 50 passing into the lower rear compartment 48 and thence upwardly through one or two of the three valve ports $51^x$, $51^y$ and $51^z$ formed at the rear of the horizontal partition 39, and into one or two of the lower chambers $41^x$, $41^y$ or $41^z$. After traversing the corresponding tube groups the gases thence pass through one or two of the upper chambers $42^x$, $42^y$ or $42^z$, and through the corresponding upper rear valve ports $52^x$, $52^y$ or $52^z$ in the upper partition 38, these delivering into the upper rear compartment 45 from which a gas exit or flue 53 extends to the stack. During their passage through the tube groups the gases have their dust and heat extracted as previously explained.

The cold air or other fluid may enter the apparatus through entrance 55 passing into the upper front compartment 44. The upper partition 38 is here formed with three valve ports $56^x$, $56^y$ and $56^z$ and the air will pass downwardly through one or more of these into the corresponding chambers $42^x$, $42^y$ or $42^z$, and thence through the corresponding tube units and into the corresponding lower chambers $41^x$, $41^y$ or $41^z$, and thence through the lower front ports $57^x$, $57^y$ or $57^z$ and the lower front compartment 47, and thence out by exit 58 to the place of use. It will be understood that in its passage through the previously heated tube units the air is highly preheated, extracting heat both from the tubes and the interior helical vanes on the regenerative principle and leaving them relatively cool.

The control of operations to put the several units into action in rotation is effected by a series of valves, there being three pairs of valves above and three pairs below the tube units cooperating with the twelve valve ports already described. Thus the upper front valves are designated $61^x$, $61^y$ and $61^z$ respectively, from left to right, while the lower front valves are designated $61^{xx}$, $61^{yy}$ and $61^{zz}$. At the upper rear are similar valves $62^x$, $62^y$ and $62^z$ and at the lower rear valves $62^{xx}$, $62^{yy}$ and $62^{zz}$. The upper and lower front left valves are connected by a stem $63^x$ and the middle and right valve similarly by stems $63^y$ and $63^z$. At the rear the corresponding upper and lower valve pairs are similarly connected by valve stems $64^x$, $64^y$ and $64^z$. These several stems cause each pair of valves, upper and lower, to operate simultaneously so that when the air entrance is cut off from a given chamber and tube unit the air exit will be cut off from the same, and vice versa. The stems all show exteriorly, sliding through bearings in the inclined parts of the front and rear shell walls 34.

The several valves may be operated in rotation by any known valve operating means such as a system of tappets or wipers actuated by cams. Thus the three front valve stems are extended upwardly through the top wall 36 and at their upper ends carry respectively wipers $66^x$, $66^y$ and $66^z$; while the three rear valve stems similarly carry wipers $67^x$, $67^y$ and $67^z$. A system of six cams is shown marked $68^x$, $68^y$ and $68^z$ for the front wipers and valves and $69^x$, $69^y$ and $69^z$ for the rear wipers and valves. All of these cams may be mounted on a single cam shaft 70 having suitable bearings on top of the apparatus and this shaft is indicated as being rotated by reduction gearing 71 from an electric motor 72 or other source of power. The speed may be such as to give the shaft a complete rotation, for example in from two to three minutes so that that period represents the complete cycle of regeneration in each of the three tube units or sections.

The arrangement of the six pairs of valves, their wipers, and the six cams is generally indicated in Figs. 1 and 7, but the construction and design thereof will be better understood by a statement of the preferred timing of operation of the parts. As shown in these figures the front valve $61^x$ and the rear valve $62^y$ are open and the other four upper valves closed. Without further explanation it will be understood that when valve $61^x$ is open its lower or paired valve $61^{xx}$ is also open. The illustrated adjustment therefore means that atmospheric air entering the upper front compartment is passing downwardly through valves $61^x$ and $61^{xx}$ and through the tube unit $26^x$ interposed between them. At the same time the hot furnace gases pass up through the lower valve $62^{yy}$ and the upper valve $62^y$ and the tube unit $26^y$ interposed between them. The third tube unit is idle. The two streams, of furnace gases and air, are kept separate and it will be found that throughout the following described valve operation short circuiting between the gases and air is at all times prevented, while at the same time continuous flow of both is permitted, thus avoiding any interruption of action. It will be further understood that the forcing action of natural draft can be supplemented by fans, blowers, etc., in case of either the gases or air.

The first front valve $61^x$ and the second rear valve $62^y$ being open in Figs. 1 and 7 the subsequent actions may be substantially as follows. A complete cycle of actions, represented by one complete turn of the cam shaft, may be roughly divided into six periods of 60° rotation each. The cam and valve operations during these six periods are preferably as follows. In the first period the rear or gas valve $62^y$ is closed by cam $69^y$ and the gas valve $62^z$ is opened by cam $69^z$, these movements being simultaneous so that one or both of them are constantly open. During this first period the front or air valve $61^x$ remains open and at the end of the period the valves $61^x$ and $62^z$ are open, the other four being closed.

In the second period the air valve $61^x$ will be closed by cam $68^x$ and the air valve $61^y$ opened by cam $68^y$, these actions overlapping; and at the end of this period the valves $61^y$ and $62^z$ only are open. In the third period the gas valve $62^z$ is closed by cam $69^z$, while the gas valve $62^x$ is opened by cam $69^x$, the air valve $61^y$ remaining open. In the fourth period the air valve $61^y$ is closed by cam $68^y$ and the air valve $61^z$ opened by cam $68^z$, while the gas valve $62^x$ remains open. In the fifth period the gas valve $62^x$ is closed by cam $69^x$ and the gas valve $62^y$ is opened by cam $69^y$, while the air valve $61^z$ remains open. Fig. $7^a$ shows the parts at this stage or position. In the sixth period the air valve $61^z$ is closed by cam $68^z$, and the air valve $61^x$ opened by cam $68^x$, while the gas valve $62^y$ remains open. The condition is now the same as at the commencement of the cycle and as shown in Fig. 1. At no time during any period have air and gas valves been simultaneously open leading to the same tube units; and at no time have all of the air valves, nor all of the gas valves, been closed.

In any embodiment there may be provision for adjusting the capacity of the apparatus in case of use in a plant with widely varying service. For example, with decrease of rating or service and reduced flue gas discharge, the linear rate of travel would tend to decrease and impair the dust extracting and fluid heating functions, and this can be avoided by decreasing the capacity of the apparatus, for example by more or less shutting off or closing the system of tubular units, as by dampers overlying the tube groups in Fig. 1 and shiftable to vary the number units open to flow.

Referring next to the embodiment shown in Figs. 8 and 9 this, while on the regenerative principle, avoids the reciprocating action of Fig. 1 and operates with a smooth continuous action. The tubular elements 20 are contained in sector shaped sections or units $26^a$ containing also settling spaces having dust outlets $29^a$. A series of these units are assembled in cylindrical form and enclosed stationarily in a cylindrical shell 75. This shell contains a chamber 76 below the tubular units, enclosed by a bottom wall 77, with a hot gas entrance 78 into the chamber. The shell also contains an upper chamber 79 enclosed by a top wall 80 and with a gas exit 81 leading to the stack. By this arrangement the furnace gases enter through the lower chamber and pass up through such of the tubular elements as are accessible, these elements extracting the dust and themselves becoming highly heated, the gases then passing out at the top In this form of apparatus the air flow may be arranged as follows. Above the tube units is shown a hollow slide or air box 82 open at its underside and arranged in sliding contact with the system of tube units, so that by moving the box around it may act as a valve, its height being insufficient to block the exit 81. The air box 82 is shown connected by a curved pipe or elbow flue 83 with a central pipe 84 standing out at the top of the apparatus and constituting an air entrance. Through the center of the apparatus extends a vertical shaft 85 which may be rotated and which carries the air box 82 and connected parts 83 and 84, and the shaft may be hollow for purposes described. The central pipe 84 is shown as carrying a gear 86 driven by a pinion 87 on a shaft 88 turned in any suitable manner to effect slow rotation of the shaft 85 and travel of the air box 82 around the system of tube units.

By this arrangement the incoming air may pass through the elbow 83 into the air box 82 and thence through a certain number of tubular elements 20, which elements are thereby cut off from the furnace gas circulation. Below the tubular elements the air travel may be continued as follows. A lower air box 89 is shown attached to the shaft 85 in opposition to the upper air box so that the two travel around in synchronism. A lower air box is shown connected by an elbow pipe 90 with a lower central pipe 91 constituting an exit for the heated air. The central shaft 85 is shown hollow to serve as a passage for carrying off the dust collected in the dead spaces of the sector units $26^a$. Opposite the dust outlets $29^a$ the hollow shaft or pipe 85 is shown formed with apertures 93 conducting the dust from the units into the shaft, the dust descending through the hollow shaft and passing out at the lower end or outlet 94, which may be supplemented by suction means to expedite the progress of the dust, and means preventing flow of gas or air such as damper 95.

Each tubular element in the described apparatus will be seen to serve first as a furnace gas passage, becoming heated and extracting the dust, until the air box covers the ends of the element whereupon the flow is reversed and the air passes downwardly and becomes heated. The relative periods of gas flow and air flow through each tube are readily regulable by predetermining the size or angle subtended by the air boxes. Occupying substantially half of the circumference each tubular element will be heated during about half the total cycle and give up its heat to the air during the remaining half. The complete cycle or turn of shaft 88 may occupy from two to three minutes more or less.

The entire arrangement can be very simply reversed by holding stationary the air boxes and connected elbow pipes and arranging to rotate within the shell the cylindrical system of tube units. In this case the central shaft will carry the tube system rather than the air boxes and the drive will be applied directly to the shaft instead of to the central pipe as shown in Fig. 8.

Referring next to the embodiment shown in Figs. 10 to 13, this is not on the regenerative principle, but involves the continuous simultaneous flow of furnace gases and fluid to be heated at opposite sides of heat transmitting walls. A system of vertical tubular elements of a double tubular type are shown. It is to be understood however that although shown vertical these elements might extend inclinedly or horizontally, and this statement applies to the previously described embodiments. The double tubular element 100 consists of an interior portion substantially as described in connection with Figs. 3 and 4. It presents an elongated passage or corridor 20 and is slit longitudinally for escape of dust and contains whirling means such as helical strips or vanes 22. With this regular tubular element is combined an outer tube 101 also slit or cut away longitudinally at one side corresponding to the slit in the inner tube. The inner tube therefore presents a helical passage for the flow of furnace gases, while the inner and outer tubes between them enclose a crescent shaped channel 102 for the flow of air or fluid to be heated, preferably downward or in a direction opposite to the gas flow. As before a lower inclined plate 103 is employed, arranged to receive the dust particles escaping from the inner tube, and in this embodiment a similarly inclined upper plate 104 is shown; these two plates having apertures through which the inner tubes extend, the outer tubes however being confined between the two plates. Referring to Fig. 11 the gas enters the center passage at 106 and leaves at 107, while the air enters the crescent passage at 108 and leaves at 109, becoming preheated by transfer through the inner top wall.

The apparatus shown in Fig. 10 comprises an outer shell 111 which may be square or cylindrical. A bottom plate 112 closes the lower end, and below this is a pipe or connection 113 constituting an entrance for hot gasses from the furnace. At the top of the shell is a similar closing plate 114 above which is an exit 115 for the spent gases issuing from the tubular elements.

The entrance 116 for air or fluid to the shell may deliver to a chamber 117 between the upper plate 104 and the top plate 114, so that the air will pass downwardly through the crescent channels 102 being thence delivered into the chamber 118 between the lower plate 103 and bottom plate 112, from whence the heated fluid passes out of the exit 119. As the passages 102 are wholly separate from the gas passages either air or water may be the fluid heated or preheated for supply to the furnace or boiler.

The dust accumulating in the collecting chamber or dead space 120 between the plates 103 and 104 slides down the plates 103 and passes through an outlet opening 121 into a closed or tubular trough 122 which may contain a conveyor 123 in the nature of a screw or otherwise causing the progressive outfeed of dust to a suitable delivery point.

Figs. 14 to 16 show a modification operating like Figs. 11 to 13 except containing structural details like Figs. 5 and 6.

With the use of the present invention the waste heat contained in the outgoing furnace gases may be recovered to an extent between one and ten per cent of the total heat of combustion. The extraction of dust brings about an actual fuel saving by recovery of fuel particles carried off with the gases, the recovery in some cases amounting to between one half per cent and three percent of the total fuel burned; permitting the same to be returned to the furnace and burned. Although combining both the dust separator and the heat recuperator the apparatus of the present invention occupies only the space ordinarily required for either one of these functions and permits a corresponding reduction in the cost of installation. The loss of draft through the fluid heater is low as compared with other types of preheaters. It is believed that the heat recovery action is increased owing to the increased friction of the hot gas threads upon the metal tubes due to centrifugal force, which may in some cases approximately double the heat absorption and recovery per unit of surface as compared with other forms of preheating apparatus. The absorption of heat by the tubular elements is increased due to the increased flow of the gases in contact with the elements. The air heater as such occupies an exceedingly small space for a given quantity of heat absorbed by a given quantity of air. The combining of the two functions in one apparatus tends to avoid the congestion of the heater by the dust of the furnace gases.

There have thus been described a method and an apparatus for the treatment of furnace gases for separating dust and for recovering heat embodying the principles and attaining the objects of the present invention. Since many matters of operation, combination, arrangement, construction and detail may be variously modified without departing from the principles involved, it is not intended to limit the invention to such matters except so far as set forth in the appended claims.

What is claimed is:

1. Apparatus for extracting dust and recovering heat from furnace gases, comprising a number of elongated or tubular passages through which the hot dust-laden gases are flowed in subdivided streams, a settling chamber exterior to such passages for the reception of the dust extracted from the gases flowing through the passages, the passages constructed with apertures in their walls for the ejection of dust from the flowing gas streams into the settling chamber, and with means subjecting the flowing gas streams to centrifugal force to cause such ejection of dust into the settling chamber, and means for conducting air or recovery fluid in contact with the walls of such passages to take up from such walls the heat received from the hot gases.

2. Apparatus for extracting dust and recovering heat from furnace gases, comprising a number of tubular passages through which the hot dust-laden gases are flowed in subdivided streams, a housing enclosing a settling chamber exterior to such passages for the reception of the dust extracted from the gases flowing through the passages, the passages constructed with longitudinal slits in their walls for the ejection of dust from the flowing gas streams into the settling chamber, and with interior means for whirling the flowing gas streams to cause such ejection of dust into the settling chamber, and means for conducting recovery fluid in contact with the walls of such passages to take up from such walls the heat received from the hot gases.

3. Apparatus for extracting dust and recovering heat from furnace gases, comprising a bank of elongated passages through which the hot dust-laden gases are flowed in subdivided streams, a closed settling chamber exterior to such passages for the reception of the dust extracted from the gases flowing through the passages, the passages constructed of scroll form with tangential ejection slits in their walls for the ejection of dust from the flowing gas streams into the settling chamber, and with means subjecting the flowing gas streams to whirling motion to cause such ejection of dust into the settling chamber, and means for conducting air or recovery fluid in contact with the walls of such passages to take up from such walls the heat received from the hot gases.

4. Apparatus for extracting dust and recovering heat from furnace gases, comprising a number of elongated or tubular passages through which the hot dust-laden gases are flowed in subdivided streams, a settling chamber exterior to such passages for the reception of the dust extracted from the gases flowing through the passages, the passages constructed with apertures in their walls for the ejection of dust from the flowing gas streams into the settling chamber, and with means subjecting the flowing gas streams to such motions as to cause ejection of dust through the apertures into the settling chamber, and exterior channels surrounding the unapertured parts of the passages for conducting recovery fluid in contact with the walls of such passages to take up from such walls the heat received from the interior hot gases.

5. Apparatus as in claim 1 and wherein each of the gas flow passages and surrounding channel are formed by double walled tubular element of crescent shape with its inside gas passage discharging into the settling chamber and its crescent shape fluid channel adapted for continuous flow of recovery fluid insulated from both the gas passage and settling space.

6. Apparatus as in claim 1 and wherein the settling chamber has an inclined bottom receiving the dust ejected from all the passages and means at the foot thereof for removing collected dust without permitting gas flow.

7. Apparatus for extracting dust from furnace gases comprising a number of parallel passage elements through which the gases are flowed in separate streams and constructed to subject the gases to centrifugal force, and having dust escape apertures, and an outer housing enclosing a dust receiving and settling space surrounding such elements, said housing having an inclined dust receiving bottom discharging toward a dust outlet, and conveyor means for the methodical removal of collected dust.

In testimony whereof, this specification has been duly signed.

JAY GOULD COUTANT.